US012681173B2

(12) United States Patent
Kavli et al.

(10) Patent No.: US 12,681,173 B2
(45) Date of Patent: Jul. 14, 2026

(54) PRESENCE DETECTION

(71) Applicant: Elliptic Laboratories ASA, Oslo (NO)

(72) Inventors: Tom Øystein Kavli, Oslo (NO); Espen Klovning, Strømmen (NO); John Magne Helgesen Røe, Sørumsand (NO)

(73) Assignee: Elliptic Laboratories ASA, Oslo (NO)

( * ) Notice: Subject to any disclaimer, the term of this patent is extended or adjusted under 35 U.S.C. 154(b) by 117 days.

(21) Appl. No.: 18/723,590

(22) PCT Filed: Jan. 20, 2023

(86) PCT No.: PCT/EP2023/051374
§ 371 (c)(1),
(2) Date: Jun. 24, 2024

(87) PCT Pub. No.: WO2023/144034
PCT Pub. Date: Aug. 3, 2023

(65) Prior Publication Data
US 2025/0060480 A1     Feb. 20, 2025

(30) Foreign Application Priority Data

Jan. 26, 2022    (NO) .................................... 20220132

(51) Int. Cl.
G01S 15/04 (2006.01)
G01S 15/32 (2006.01)
(Continued)

(52) U.S. Cl.
CPC ............ G01S 15/04 (2013.01); G01S 15/325 (2013.01); G01S 15/34 (2013.01); G01S 15/523 (2013.01); G01S 15/88 (2013.01); H05B 47/115 (2020.01)

(58) Field of Classification Search
CPC ........ G01S 15/04; G01S 15/325; G01S 15/34; G01S 15/523; G01S 15/88; H05B 47/115
(Continued)

(56) References Cited

U.S. PATENT DOCUMENTS

| | | | | |
|---|---|---|---|---|
| 10,520,601 | B2 * | 12/2019 | Cohen ...................... | G01S 15/42 |
| 10,746,897 | B1 * | 8/2020 | Gentry ................. | H05B 47/115 |
| 10,795,018 | B1 | 10/2020 | Koteshwara | |
| 2011/0103448 | A1 * | 5/2011 | Dahl ...................... | G01S 7/5273 |
| | | | | 375/224 |

(Continued)

FOREIGN PATENT DOCUMENTS

| | | |
|---|---|---|
| EP | 2983063 A2 | 2/2016 |
| NO | 20210781 A1 | 12/2022 |

(Continued)

OTHER PUBLICATIONS

Patent Cooperation Treaty, International Application No. PCT/EP2023/051374, "International Search Report," Mar. 30, 2023, 2 pages.

*Primary Examiner* — Kerri L Mcnally
(74) *Attorney, Agent, or Firm* — Bradley Arant Boult Cummings LLP

(57) ABSTRACT

The present invention relates to a device and a method for presence detection in the vicinity of a device. The device including an acoustic receiver and corresponding analyzing unit for analyzing the received signals, and an acoustic transmitter, the transmitter and received being configured to operate within a predetermined acoustic frequency range. The method including the steps of receiving and analyzing acoustic signals from the environment within said frequency range and evaluating the periodicity and volume of the signals and identifying frequency ranges and/or time windows with low risk for interference, the transmitter being configured to transmit a presence detection signal within the identified frequency range and time windows, the receiver receiving reflections from the transmitted presence detection
(Continued)

signals from which the analyzing unit indicates the possible presence of a user.

15 Claims, 3 Drawing Sheets

(51) Int. Cl.

| | | |
|---|---|---|
| *G01S 15/34* | (2006.01) | |
| *G01S 15/52* | (2006.01) | |
| *G01S 15/88* | (2006.01) | |
| *H05B 47/115* | (2020.01) | |

(58) Field of Classification Search
USPC .......................................................... 367/93
See application file for complete search history.

(56) References Cited

U.S. PATENT DOCUMENTS

| | | | | |
|---|---|---|---|---|
| 2014/0292507 A1* | 10/2014 | Null | .................. | G08B 13/1645 |
| | | | | 340/523 |
| 2016/0077197 A1* | 3/2016 | Vangeel | .................. | G01S 7/527 |
| | | | | 315/297 |
| 2020/0367810 A1 | 11/2020 | Shouldice et al. | | |
| 2020/0409489 A1* | 12/2020 | Munemoto | ............. | G06F 3/043 |
| 2021/0231615 A1 | 7/2021 | Munemoto et al. | | |

FOREIGN PATENT DOCUMENTS

| | | | |
|---|---|---|---|
| NO | 20211333 | A1 | 5/2023 |
| WO | WO-2012131359 | A1 | 10/2012 |
| WO | WO-2017137755 | A2 | 8/2017 |
| WO | WO-2019122413 | A1 | 6/2019 |
| WO | WO-2021045628 | A1 | 3/2021 |

* cited by examiner

PRESENCE DETECTION

The present invention is related to electronic devices using acoustic transducers for measuring the proximity or distance to an object, specifically a user of the device, using ultrasound measurements.

More specifically, the present invention is related to electronic devices using acoustic transducers for measuring the proximity or distance to at least one object, the trajectory, angle or velocity of at least one object, detecting human gestures and hand and finger movement using acoustic measurements. In most cases, the user of the device is the object of interest, but it could be other objects too.

Electronic devices with at least one processing element capable of doing signal processing and an audio system that is capable of transmitting and receiving ultrasound using input and output devices (e.g. microphones, speakers, transducers, etc) can be used for a set of different use-cases such as detecting proximity, gestures, hand and finger movements, presence, fall detection, etc of a user, e.g. for automatic sleep mode or conditional activities.

Presence functionality is becoming more prevalent in a lot of electronic devices and in a wide variety of verticals and use-cases. Traditionally, presence devices have been implemented in single-purpose, presence detection devices based on infrared or ultrasound sensors using limited processing if any. More recent solutions, as discussed in WO2017/137755 or WO2020/1045628, a unit is employed where it is possible to use already existing sound transducers in the ultrasound range to detect the proximity of a user.

A potential problem related to acoustic presence detection is interference from other sources in the vicinity of the device. In US2020367810 and WO2019122413 background noise is preferably avoided by filtering, but other devices are handled by detecting the other devices in the vicinity and adjust the transmitted signals in order to avoid interference from them. Background interference may cause false positives (FP) in the detection which may cause a device to be activated and thus increase the power consumption. Thus, there is a need for a device and method for avoiding or reducing the number of false positives in presence detection while decreasing the power consumption. The solution to this problem is obtained as specified in the accompanying claims.

The present invention thus provides a method and device where the surroundings are monitored at a sufficient rate to provide an overview of other sources and signals from the surroundings within the operating rage of the transmitter and receiver in the present invention. This is performed by analyzing and signals from the environment for detecting frequencies or time windows where the signals may be transmitted and detected without interference before transmitting the signals, and thus reduce the power consumption of the device.

The invention will be described more in detail below with reference to the accompanying drawings illustrating the invention by way of examples:

Figure 1:
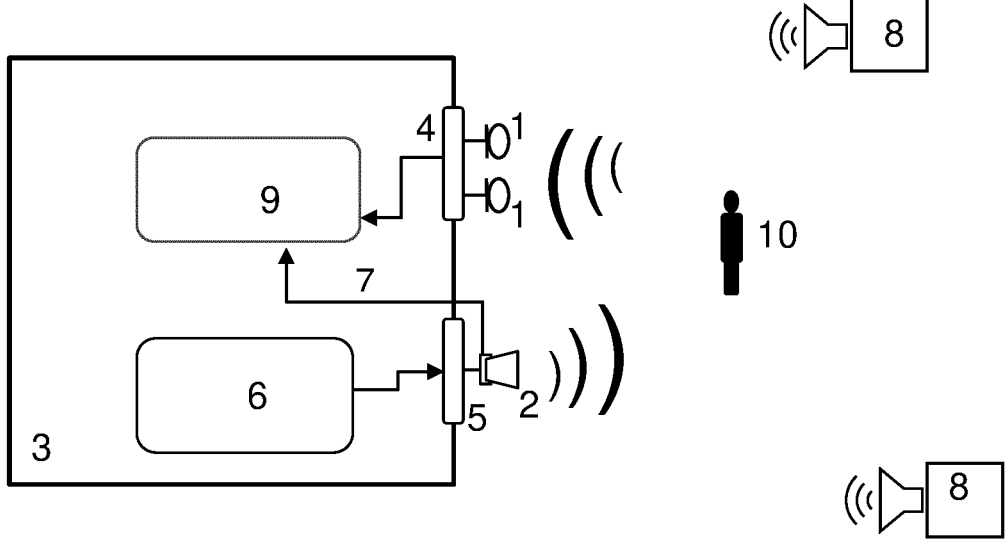
FIG. 1 illustrates a device and external transmitters . . . .

As illustrated in FIG. 1 the present invention relates to an electronic device 3 using at least one speaker 2 transmitting acoustic presence detection signals, preferably in the ultrasound range, and at least one microphone or receiver 1 receiving signals reflected from an object, preferably a user 10 in the vicinity of the device. The device 3 includes a signal generator 6 transmitting the generated presence detection signal to the speaker, e.g. though an interface or codec 5 to the speaker 2. While the presence detection signal is preferably in the near ultrasound range, e.g. 20-30 kHz, so as not to disturb a user, it may also be in the audible range, for example using specific, preferably high, frequencies in known acoustic signals such as music playback.

A processor 9 receives the signal from the microphones 1 though an interface 4, and is preferably provided with a connection 7 from the speaker 2 or generator 6 in order to detect the time lapse from the transmission to the reception, and possibly other characteristics influencing the reflected signal, as discussed in Norwegian patent application NO20211333. The echo reference signal will usually have been implemented in devices having echo cancellation algorithms.

As also discussed in NO20211333 a speaker protection algorithm may be included in the generator 6, interface 5 or speaker 2. The echo reference signal 7 will then include the results of the algorithm. As long as the speaker protection algorithm may alter the output signal due to the protection algorithms (e.g. temperature protection, excursion protection) used to protect the audio output device (e.g. speaker), the echo cancellation needs to get the altered signal to work properly. If the speaker protection algorithm does not change the ultrasound signal but include provision to do speaker protection before the ultrasound signal will be mixed in with the audio signal during or after the speaker protection without being considered in the speaker protection algorithm apart from possibly setting aside headroom for the ultrasound signal during the speaker protection algorithms. It does not matter if the speaker protection algorithm is running in a SoC processor (e.g. Audio DSP) or if it is running in a more high-end Smart Power Amplifiers with an embedded processor driving the audio output device. In all cases, the audio framework or external components such as Smart PAs needs to provide the echo reference signal.

Since the device is sending out a known acoustic signal, the processing in the processing topology 9 should also get access to the echo reference signal. If the speaker protection algorithm has modified the acoustic signal in the ultrasonic frequency range, the echo reference signal should include data in the ultrasonic range. If the speaker protection algorithm ignores the ultrasonic range and does not alter the signal in the ultrasonic frequency range, the echo reference signal may not include these frequencies.

Receiving the echo reference signal 7 will enable the receive processing to analyze what the speaker protection or other processing modules, which may have altered the original acoustic signal transmitted by the device, have done to the signal. If changes have been made, the receive processing of the device can take these changes into account during signal processing, which will make it easier to filter out the signals from other sources 8 in the environment, as will be discussed below.

As alternatives to the illustrated device in FIG. 1, the speaker 2 may be positioned in an external device or may be an independent device transmitting a signal including some known parameters.

In FIG. 1 it is shown that other acoustic signal generators 8 are also in the vicinity of the device, generating signals that either directly or indirectly may be received by the microphones and cause false presence detections. As discussed above the present invention is aimed at avoiding any interference from these external transmitters. This is obtained by analyzing the signals form the background and other sources 8 and using time slots or frequency ranges where the signal to noise level may be maximized. The preferred signal to noise level may depend on the situation and practical situation. For example, coding of the presence detection signal may improve the capability of the present invention to distinguish the presence detection signal from the background or other sources. It may also be possible to increase the signal strength of the presence detection signal relative to the background to improve the signal to noise level.

Different filtering techniques may also be applied to transmitted and detected signals to improve the detection rate, including adaptive filtering based on monitoring of the environment, e.g. based on the feedback 7 and the signal received at the receivers 1. Thus, the term "low" with reference to background noise in this context may vary with the situation but will imply that the system is capable of distinguishing the presence detection signal from the background, having a signal to noise level within the selected frequency and/or range amplitude, according to the specific of the implemented sensors and processors.

The analysis according to the invention may, as described above, be configured to detect time slots and frequency ranges allowing the presence detection signal to be undisturbed. The analysis may be based on finding periodic events but it may also use more advanced analysis utilizing machine learning based on previous measurements.

The analysis may also be based on recognizing the measured acoustic signal, such as a music played in the environment based on access to a database, and based on the known development of the recognized sounds predict available time or frequency slots and transmit the presence detection signal within those time or frequency slots.

Figure 2:
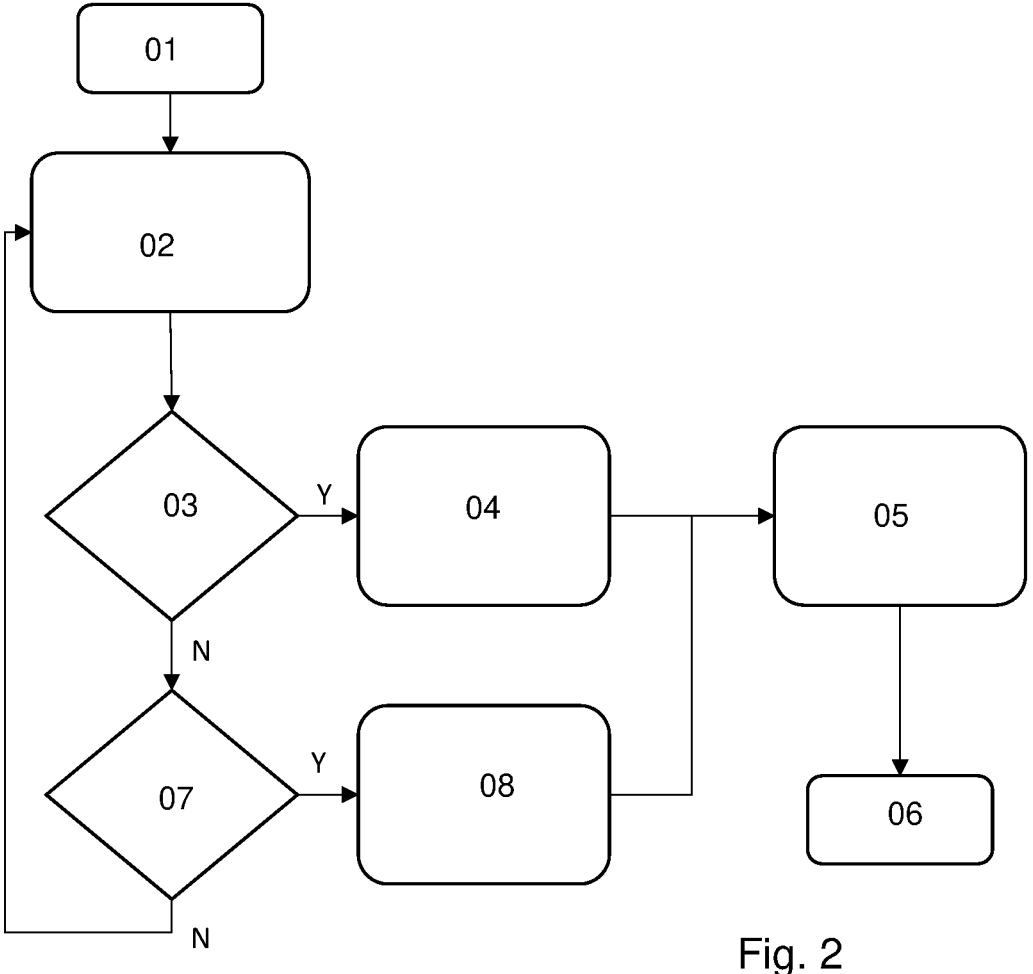
FIG. 2 Illustrates a flowchart of the main aspects of the method according to the present invention.

A duty cycle (DC) according to the present invention is illustrated in FIG. 2, where the process is illustrated as follows:

01: Start DC.
02: Record and analyze the environmental noise.
03: If repeated low noise periods are detected:
    04: Adapt transmitted signal to transmit within low noise periods and start transmission.
    05: Run detection algorithm for a predetermined time or until presence is detected.
    06: Stop Duty Cycle.
or if repeated low noise periods are not detected:
    07: If frequency bands with low noise is detected:
        08: adapt transmitted signals to low noise frequencies and start transmission.
        05: Run detection algorithm for a predetermined time or until presence is detected.
        06: Stop Duty Cycle.
    or if repeated low noise frequency bands are not detected, return to step 02.

If no low noise time periods or frequency bands are detected the duty cycle may stop after a predetermined time period.

In the following it is assumed that interference from other devices can cause false positive presence detections (False Positives—FP) but they cannot produce false negative presence detections (False Negatives—FN) as it would mean that the interfering signal cancels the characteristics of the transmitted signal. The false positives may occur as the interfering signal may include similar characteristics, for example when similar devices are in the vicinity.

At the detection of a false positive there are several options.

1. Do Nothing

Interference collisions will happen sporadically, and they may cause a FP causing the sensor to turn off. Hopefully there is no interference collision in the next duty cycle, so a true far will be detected then. Preferably random variations are added in the DC intervals to avoid repeated collisions in case the interfering device or source is using a regular transmission pattern. There are some limitations to this method that are discussed elsewhere.

2. Listen for Interference Before Transmitting Ultrasound

Before we start emitting ultrasound in a DC we can listen for interference and environmental noise. If noise is detected, we wait for the noise to stop, or we terminate the DC and start again after a random time.

Other benefits are that we avoid disturbing other devices with interference and we use less power on this aborted DC. And this noise detector handles all kinds of noise, such as water tap, cutlery, and kitchen machinery, and may thus replace the noise warning node currently used.

If the wait time for silence is too long, we report a noisy environment and fall back to safe mode.

3. Listen for Interference and Synchronize

Before we start emitting ultrasound in a DC we listen for interference. If such noise is detected we check if there is a noise free time slot between chirps from the interfering devices, and if so we synchronize the transmission of our chirps to fit into that slot. This will reduce chances for FP in both devices.

4. Listen for Interference After a Presence Is Detected

Assuming interference can only cause FP, not FN, we can after we have detected presence stop transmitting ultrasound and check for interference. If it is found that the presence detection was caused by interference, we start a new DC shortly after, hoping that we do not experience a collision the next time. The only practical difference from 1 is that the next DC is started earlier. The wait time after the interference noise is gone till we try playing ultrasound again can be randomized to avoid that many devices start simultaneously as soon as one is finished.

5. Method 2, 3 and 4 Combined

According one embodiment all three methods in the same node may be combined in the processing topology.

Figure 3:
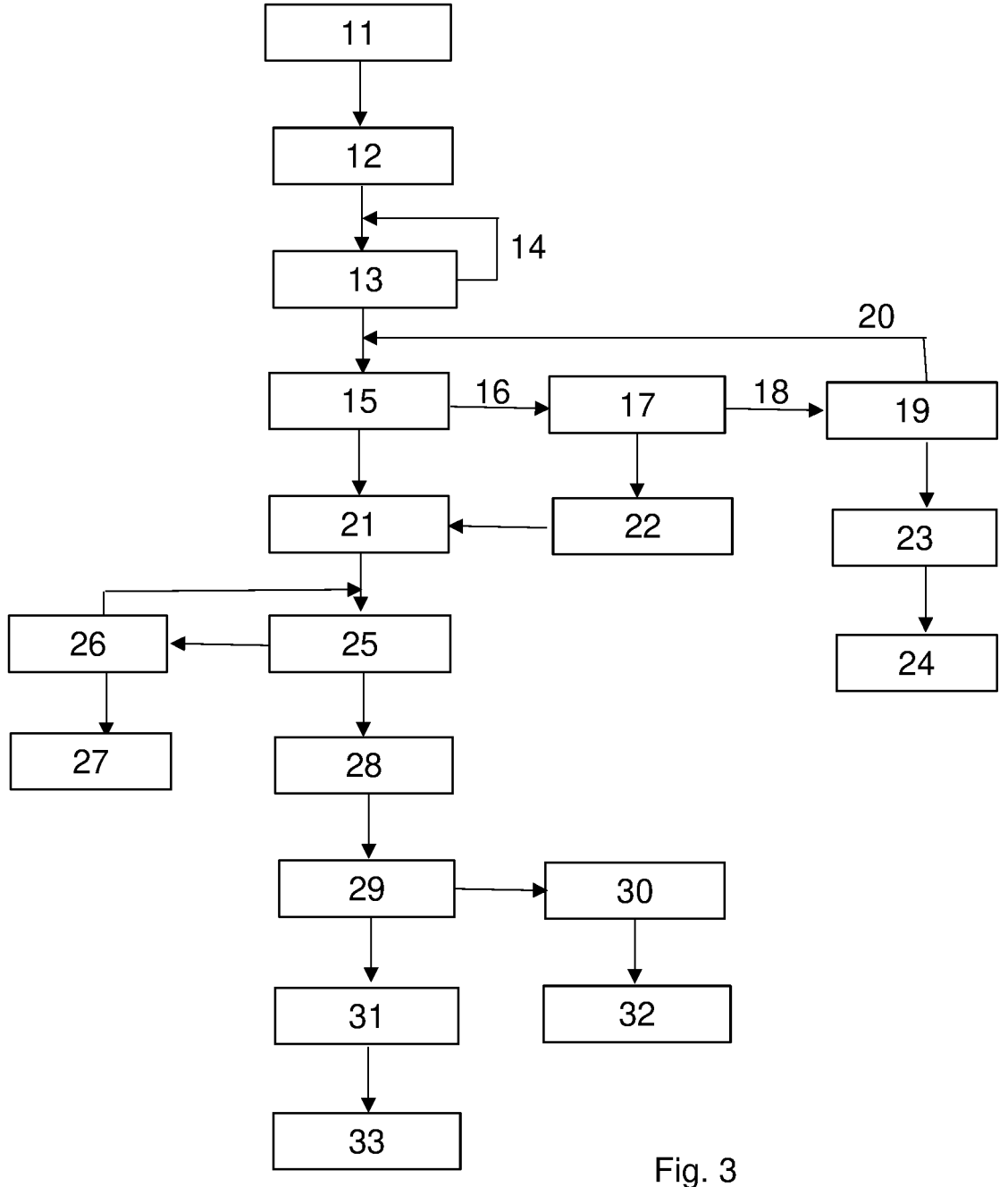
FIG. 3 illustrates a flowchart illustrating the according to an embodiment of the invention.

These options are illustrated in FIG. 3 showing one possible embodiment of the method and procedure according to the invention, wherein a more detailed possible duty cycle is suggested. The duty cycles is started 11 automatically after a predetermined time schedule, e.g. based on the method described in NO20210781.

In FIG. 3 a preferred sequence is illustrated with the following reference numbers are used:
    11. Start of duty cycle
    12. Start audio I/O in muted mode.
    13,14. Wait for time stamp latency estimation until latency is not determined.
    15. Listen for interference and other noise.
    16. Noise detected.
    17. Is there a noise free time slot?
    18. No time slot detected.
    19. Is silence timeout reached?
    20. Silence timeout not reached, return to listening mode.

21. Unmute output.

22. Synchronize to noise free time slot.

23. Set long time to next duty cycle.

24. Report fail to find time slot and end duty cycle.

25. Run presence detection.

26. Is detection timeout reached?

27. If detection timeout reached, report no presence and end duty cycle.

28. Presence detected, mute output.

29. Listen for interference and other noise.

30. If noise detected, set short time to next duty cycle.

31. If no noise detected, set random time to next duty cycle.

32. Report presence and end duty cycle

33. Report presence and end duty cycle.

In the first step 12 the audio I/O is muted and thus the system is in a listening mode. Preferably a silence timeout period is set for unmuting the audio.

In the next step 13, the duty cycle is paused for a predetermined time by repeating until a predetermined latency period is reached 14, thereby reducing the chance for collision. The leave detection latency will increase correspondingly.

After reaching the end of the latency period, the system will listen for inference or other noise 15. If noise is detected 16, the noise is analyzed for detecting noise free time slots 17. If no noise is detected the output transmitter is unmuted 21 and the presence detection can start.

If a time slot is detected 17, typically if it is found that the noise is periodic, the system is synchronized with the low noise time slots 22 and the output transmitter is unmuted 21 for performing the presence detection. As an alternative, the system in step 17 may find a slot in the frequency range where the noise is sufficiently low and for example reduce the chirp frequency range to concentrate on the parts having low noise levels. A combination of time and frequency slots may also be contemplated.

If no available low noise time slots are detected in the background noise or frequency range 18, the system registers and compares the length of the muted period with a predetermined silence timeout 19, and if not reached 20 the system returns to listening mode 15. If timeout has been reached, the system sets a time for next duty cycle 23. The system will also report failure and end the duty cycle 24.

After unmuting the output transducer, the presence detection may be run 25. If no presence is detected, the system compares elapsed time with detection timeout 26 and as long as this is not reached repeats presence detection routine 25. If timeout has been reached the system reports no presence detected and ends duty cycle 27.

If a presence has been detected, the output is muted again 28, and the system is set to listen for noise 29. If noise is detected, a short time is set before next duty cycle 30. The detected presence is then reported, and the duty cycle is ended 32.

If no noise is detected, a random time is set within predetermined limits before the next duty cycles is to be started 31. The presence is reported, and the duty cycles is ended.

More in detail, during the procedure step 15-24 the system may have the following responses depending on the found noise characteristics:

A: If in step 15 noise is found, the system may decide to do nothing. This may be the case if the noise profile is irregular but there is a chance that the transmitted signal may be distinguishable from the noise.

B. If much interference noise is detected, reduce chirp rate introducing or increasing a silent period thereby reducing the chance for collision.

C. If the interference is too high, change the chirp type, chirp length or use orthogonally coded signals.

D. If significant interference noise from other devices is detected, send out a message to all other devices that they should all do any of the above actions. The message can be as a single sine tone, or two alternating tones, or two parallel tones, or any other code.

E. If the device can move its output signal to another frequency band without or with less interference, do so.

F. If the background audio noise is random and its amplitude is significant, our device could even move its signal into the audible range to avoid interfering devices.

Thus, to summarize the present invention relates to a method for presence detection in the vicinity of a device as well as a computer implemented program for performing the method. The device includes an ultrasound receiver and corresponding analyzing unit for analyzing the received signals, as well as an ultrasound transmitter, the transmitter and receiver being configured to operate within a predetermined frequency range. The transmitter and receiver will usually be constituted by separate transducers, preferably already implemented in the device, but may also be realized using a single transducer having both transmitter and receiver functionality.

The method includes the steps of:

receiving and analyzing ultrasound signals from the environment within said frequency range and evaluating the periodicity and volume of the signals and identifying frequency ranges and/or time windows with low risk for interference, transmitting a signal within the identified frequency range and time windows, the receiver receiving reflections from the transmitted signals from which the analyzing unit indicates the possible presence of a user.

If the analyzing unit does not identify clear time windows or frequency ranges, the transmitted signals may be transmitted at random intervals, the receiver being connected to the transmitter so as to be synchronized with the transmitted signal and to recognize the time and frequency range in each transmitted signal.

If the analyzing unit detects a periodicity in the signals received from the environment, the signal transmission may be sent in the time windows with low signals in the environment.

If the analyzing unit detects frequency ranges with low signal amplitude from the environment, the transmitted signal may be adapted to contain the detected low noise frequency range.

Also, while monitoring the noise, if an immediate detection of a low noise level occurs a presence detection signal may be transmitted.

The present invention also relates to an electronic device including a human presence detector. The device also includes a transmitter and a receiver configured for transmitting and receiving acoustic signals, preferably in a chosen ultrasound range. The transmitter and receiver may be connected to an analyzing unit for detecting a presence based on received reflections from a transmitted signal. The analyzing unit is also configured to receive signals through said receiver within the chosen range, from the environment and to analyze periodicity or time sequence and frequency range from the signal from the environment, and based on them recognize frequency ranges and/or time windows representing low chance for interference with a transmitted signal. The transmitter being configured to transmit a presence detection signal within the time windows and/or frequency ranges wherein the signals from the environment has low amplitude.

Preferably the acoustic frequency range includes frequencies within the ultrasound range, especially the near ultrasound range, and the presence detection signal is in the ultrasound frequency range, preferably in the 20-25 kHz range Depending on the signals detected from the environment the analyzing unit may be configured to perform at least one of the following:

If the analyzing unit does not recognize frequency ranges or times windows with low risk of interference, the transmitter may be configured to transmit a signal at randomized sequence and/or frequency range, the receiver being synchronized with the transmitted signal as at to be capable of receiving and analyzing reflections of the transmitted signal.

If the analyzing unit detects a periodicity in the amplitude of the signals received from the environment, the signal transmission is sent in the time windows with low signals from the environment.

If the analyzing unit detects frequency ranges with low signal amplitude from the environment, the transmitter may be configured to transmit a signal within the frequency ranges containing low noise.

In addition the analyzing unit may be configured to, at the immediate detection of a low noise level, transmit a presence detection signal.

The invention claimed is:

1. A method for presence detection of a user in the vicinity of a device, the device including an acoustic receiver and corresponding analyzing unit for analyzing the received signals, and an acoustic transmitter, the transmitter and received being configured to operate within a predetermined acoustic frequency range, the method including the steps of:

receiving and analyzing acoustic signals from the environment within said frequency range;

evaluating the periodicity and volume of the signals and identifying at least one of frequency ranges and time windows with low risk for interference;

the transmitter being configured to transmit a presence detection signal within the identified frequency range and time windows;

the receiver receiving reflections from the transmitted presence detection signals from which the analyzing unit indicates the possible presence of a user; and wherein, when the analyzing unit does not identify clear time windows or frequency ranges, presence detection signals are transmitted at random intervals, and synchronizing the analysis of the received signal with the transmitted presence detection signal and to recognize the time and frequency range in each transmitted signal.

2. The method according to claim 1, wherein, when the analyzing unit detects a periodicity in the signals received from the environment, the presence detection signal being transmitted in the time windows with low signals in the environment.

3. The method according to claim 1, wherein, when the analyzing unit detects frequency ranges with low signal amplitude from the environment, the transmitted presence detection signal being adapted to contain the detected low noise frequency range.

4. The method according to claim 1, wherein the analyzing unit is configured to, at the immediate detection of a low noise level, transmit a presence detection signal.

5. The method according to claim 1, wherein the acoustic frequency range includes frequencies within the ultrasound range, the presence detection signal being in the ultrasound frequency range.

6. An electronic device including:

a user presence detector;

a transmitter and a receiver configured for transmitting and receiving acoustic signals in a chosen frequency range;

the transmitter and receiver being connected to an analyzing unit for detecting a presence based on received reflections from a transmitted presence detection signal;

the analyzing unit also being configured to receive signals through said receiver within the chosen acoustic frequency range from the environment and to analyze the time sequence and frequency range from the signal from the environment, and to recognize frequency ranges and/or time windows having low amplitude;

the transmitter being configured to transmit a presence detection signal within the time windows and/or frequency ranges wherein the signals from the environment has low amplitude; and wherein, if the analyzing unit does not recognize frequency ranges or times windows with low risk of interference, the transmitter being configured to transmit a signal at randomized sequence and/or frequency range, the receiver being synchronized with the transmitted signal as at to be capable of receiving and analyzing reflections of the transmitted signal.

7. The electronic device according to claim 6, wherein, if the analyzing unit detects a periodicity in the signals received from the environment, the signal transmission is sent in the time windows with low signals from the environment.

8. The electronic device according to claim 6, wherein, if the analyzing unit detects frequency ranges with low signal amplitude registered from the environment, the transmitted signal is adapted to contain the detected low noise frequency range.

9. The electronic device according to claim 6, wherein the analyzing unit is configured to, at the immediate detection of a low noise level, transmit a presence detection signal.

10. The electronic device according to claim 6, wherein the acoustic frequency range includes frequencies within the ultrasound range, the presence detection signal being in the ultrasound frequency range.

11. A computer-implemented software program product comprising a non-transitory computer-usable medium having computer-readable program code embodied therein, the computer-readable program code adapted to be executed to implement the method according to claim 1.

12. The method according to claim 5, wherein the presence detection signal is in the 20-25 kHz range.

13. The electronic device according to claim 10, wherein the presence detection signal is in the 20-25 kHz range.

14. A method for avoiding false positives in presence detection of a user in the vicinity of a device, the device comprising an acoustic receiver and corresponding analyzing unit for analyzing the received signals and an acoustic transmitter, the transmitter and receiver being configured to operate within a predetermined acoustic frequency range;

wherein the transmitter is configured to transmit a presence detection signal within the identified frequency range and time windows, the receiver receiving reflections from the transmitted presence detection signals from which the analyzing unit indicates the possible presence of a user;

wherein the presence detection signals are transmitted at random intervals;

synchronizing the analysis of the received signal with the transmitted presence detection signal; and recognizing the time and frequency range in each transmitted signal.

15. An electronic device comprising:

a user presence detector configured to avoid false positive detections;

a transmitter configured for transmitting acoustic signals in a chosen frequency range;

a receiver configured for transmitting and receiving acoustic signals in a chosen frequency range; and the transmitter and the receiver being connected to an analyzing unit for detecting a presence based on received reflections from a transmitted presence detection signal, the analyzing unit also being configured to receive signals through said receiver within the chosen acoustic frequency range from the environment and to analyze the time sequence and frequency range from the signal from the environment, the transmitter being configured to transmit a signal at at least one of randomized sequency and frequency range, the receiver being synchronized with the transmitted signal as at to be capable of receiving and analyzing reflections of the transmitted signal.

\* \* \* \* \*